Figure 1:
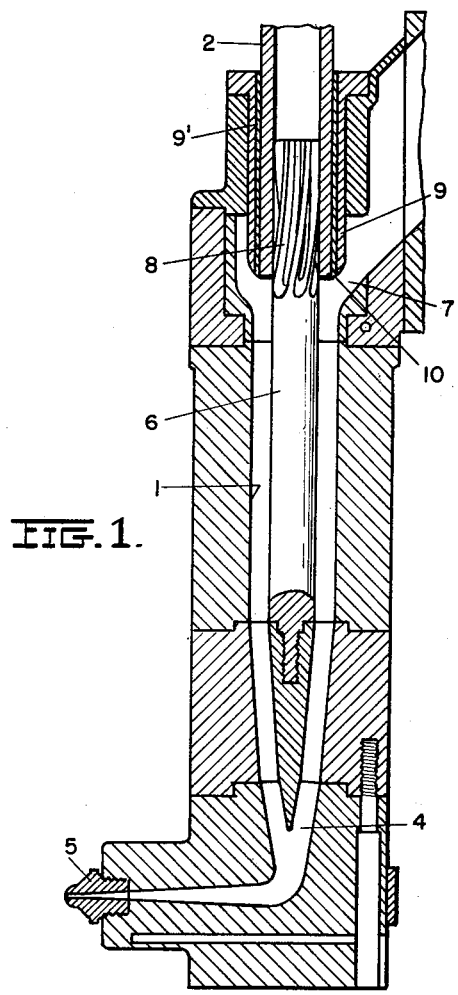

Nov. 24, 1942.  N. LESTER  2,302,873
INJECTION CYLINDER FOR PRESSURE CASTING MACHINES
Filed Dec. 29, 1939  2 Sheets-Sheet 1

INVENTOR.
NATHAN LESTER
BY
Oberlin, Limbach + Day
ATTORNEYS.

Nov. 24, 1942.    N. LESTER    2,302,873
INJECTION CYLINDER FOR PRESSURE CASTING MACHINES
Filed Dec. 29, 1939    2 Sheets-Sheet 2
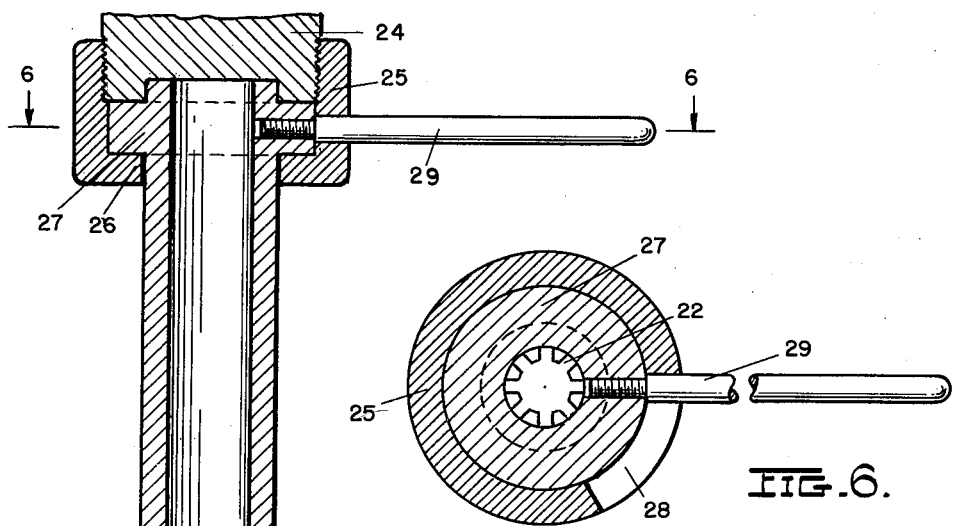
FIG. 6.
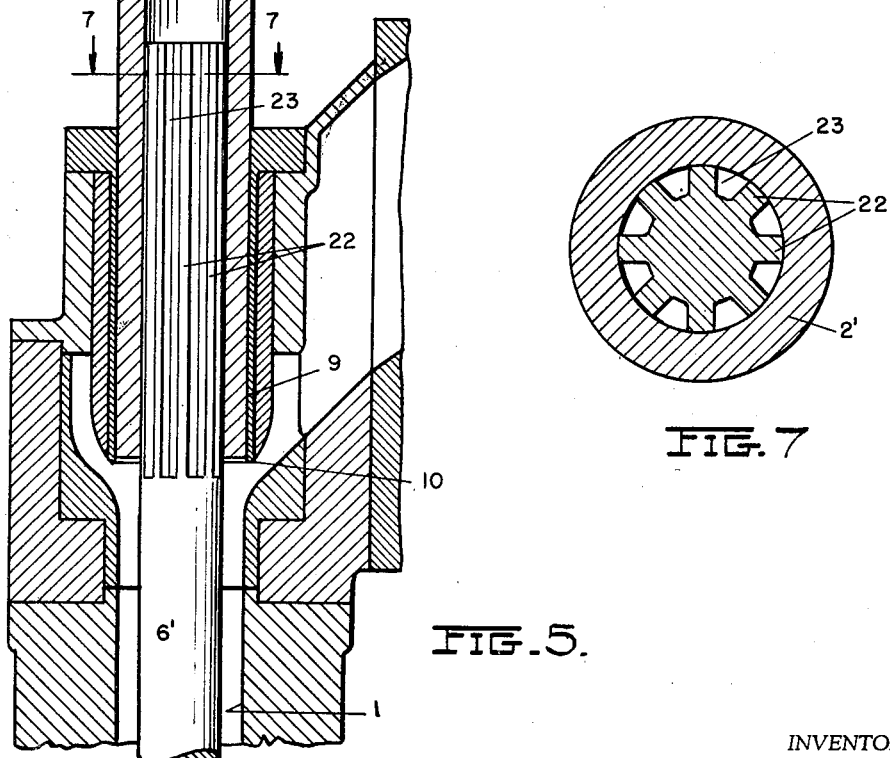
FIG. 7
FIG. 5.
INVENTOR.
NATHAN LESTER
BY
Oberlin, Limbach + Day
ATTORNEYS.

Patented Nov. 24, 1942

2,302,873

UNITED STATES PATENT OFFICE 2,302,873

INJECTION CYLINDER FOR PRESSURE CASTING MACHINES

Nathan Lester, Cleveland, Ohio, assignor to Lester Engineering Company, Cleveland, Ohio, a corporation of Ohio Application December 29, 1939, Serial No. 311,608

17 Claims. (Cl. 18—30)

The present invention relates to a novel improvement in that particular portion of a pressure casting machine wherein the material to be cast is subjected to pressure, and by virtue of such pressure is injected into the mold or die cavity. Such portion of a pressure casting machine is more commonly called the "injection assembly" or "injection cylinder." The present invention is particularly adapted for use in the pressure casting of non-metallic materials, such as plastics. Furthermore, the present invention relates to that particular type of injection cylinder wherein the means for applying pressure to the material to be passed is in the form of an annular or hollow sleeve plunger which, in turn, operates in an annular cylinder formed by the inner surface or bore of the main cylinder and the cylindrical surface of a spreader member mounted interiorly thereof.

Serious difficulty has heretofore been experienced in the pressure casting of plastic materials which are originally in the form of finely divided solid particles, and which, upon being subjected to pressure and heat, are subsequently plasticized into an integral mass. During this operation of subjecting the plastic material to heat and pressure, some particles thereof enter between the surfaces of the reciprocating annular plunger and the surfaces of the injection cylinder with which it contacts. When such particles of material become lodged between the surfaces mentioned, they very often, due to such a pronounced and severe tightening or freezing effect, prevent the operation of the annular plunger. If the movement of the plunger is thus prevented and the prime motive power applied to it is great enough, it very often operates to result in damage or fracture of some of the other parts of the injection assembly, such, for example, as resulting in the breaking off of the shank of the spreader. Regardless of how close the fit can be made between the annular plunger and the surfaces with respect to which it reciprocates, there is still bound to occur some entry of the casting material particles between these surfaces. And even the use of the strongest available materials has not overcome the damaging and rupturing effect of this action of the material.

In full appreciation of this problem and its cause, I have solved it by the present invention, not by eliminating the cause, but by utilizing it to advantage. In other words, in the principle underlying my present invention, I do not seek to prevent the particles of material from entering in between the surfaces of the annular plunger and the spreader and cylinder walls, but, on the contrary, I permit it to do so, and then effect the removal of the material from these surfaces upon each operating stroke of the plunger. In this manner, it does not have an opportunity to build up and accumulate to such proportions as to produce the disastrous and undesirable effects aforementioned.

Briefly outlined, my invention provides a plurality of relatively sharp edged lands or scraping edges on the outermost end of the injection cylinder spreader, which edges contact the interior wall of the annular plunger as closely as possible and scrape off or remove the adhering material from such interior surface. There is also provided a sharp scraping edge on the inner wall of the injection cylinder which closely fits around the exterior surface of the annular plunger and performs the same function with respect to the outside surface of such plunger.

To the accomplishment of the foregoing and related ends, said invention then consists of the means hereinafter fully described and particularly pointed out in the claims. The annexed drawings and the following description set forth in detail certain mechanism embodying the invention, such disclosed means constituting, however, but one of various mechanical forms in which the principle of the invention may be used.

Figure 3:
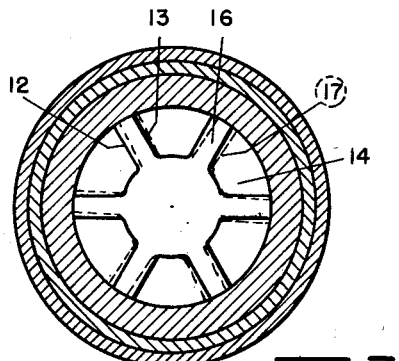
Figure 2:
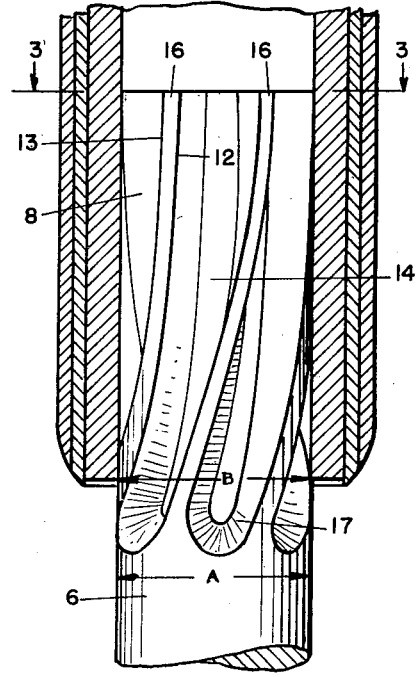
Figure 4:
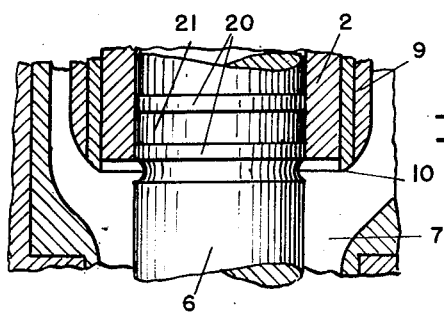

In said annexed drawings:

Fig. 1 is a sectional view taken through the injection cylinder assembly and showing a construction embodying the principle of my invention; Fig. 2 is an enlarged, detail plan view of a spreader; Fig. 3 is a sectional view taken substantially along the line 3—3 of Fig. 2; Fig. 4 is an enlarged, detail view showing a modified form of construction of the lands and grooves on the outer end of the spreader; Fig. 5 is a sectional view taken through the plunger and injection cylinder assembly and showing another modified form of construction; Fig. 6 is a transverse sectional view taken substantially along line 6—6 of Fig. 5; and Fig. 7 is a transverse sectional view taken substantially along line 7—7 of Fig. 5.

Now referring more particularly to the drawings, Fig. 1 thereof shows an injection cylinder assembly comprising the pressure cylinder 1 in which the annular plunger is adapted to reciprocate. The end of the plunger 2 extending beyond the cylinder 1 is connected to a prime moving means, such as a hydraulic pressure cylinder, (the latter elements being well-known, they are not here shown). The injection passage 4 leads from the end of the cylinder 1 to the nozzle 5, which, in turn, connects to the mold or die cavity (not shown) and in a manner well-known to those skilled in the art.

A spreader 6 is located in the interior of the cylinder 1 and throughout the majority of its extent is in the form of a uniformly cylindrical surface spaced from the inner walls or surface of the cylinder 1. The space formed between the cylinder 1 and spreader 6 constitutes the pressure chamber and through which the annular plunger 2 reciprocates on its injection and return stroke. The plunger 2 is shown in Fig. 1 at a position corresponding to the end of its return stroke or conversely, to the beginning of its injection stroke. A material feed opening 7 is provided for the introduction of the plastic material to be cast into the interior of the pressure cylinder 1. Beyond the feed opening 7, or in a direction towards the outer end of the cylinder 1, the walls of the latter are in the form of a sleeve 9 having a relatively sharp inner edge 10. In the present instance, the sleeve 9 is shown as being of a two-part construction, including the inner wall portion 9', which functions as a hardened metal insert. The cutting or scraping edge 10 is in intimate contact with the outer surface of the plunger 2 and extends slightly beyond the inner end of the plunger when the latter is at the end of its return stroke. Thus, as the plunger 2 moves on its injection or pressure stroke to compress the material in the cylinder 1, and to eject it out through the passage 4, any particles of such material which escape or enter between the outer surface of the plunger 2 and the inner wall of the cylinder 1 will be scraped off by the sharp edge 10 as the plunger 2 moves on its return stroke. The undesired and deleterious building up of a casting material deposit or mass between the outer surface of the plunger 2 and the inner wall of the cylinder 1 is thus prevented because there is a removal of material on each stroke.

The outermost end of the spreader 6 and at a point adjacent the plunger 2, when the latter is at the end of its return stroke, is in the form of a plurality of helical lands 8. The tops of the lands 8 present the rectangular or relatively sharp cutting or scraping edges 12 and 13. The lands 8 are separated by the grooves 14. The tops of the lands 8 extend radially outward a slight distance beyond the remaining portion, or uniformly cylindrical portion of the spreader 6. Thus, the diameter A of the intermediate portion of the spreader 2 is a few thousandths of an inch less than the diameter B of the tops of the lands 8. Thus, in operation, as the plunger 2 moves on its injection stroke, some particles of material are permitted to escape into the space between the inner surface of the plunger and the spreader. As the plunger moves on its return stroke, this material will be scraped off or removed by reason of the action of the edges 12 on the lands 8, and deposited in the grooves 14. Since the volume capacity of the grooves 14 is quite substantial, the plunger can be operated for an extended period of time before it is necessary to clean out the excess material from the grooves 14.

It should also be noted that the helical lands 8 are of such a pitch that the outer end 16 of one land overlaps the inner end 17 of the next adjacent land, in an axial direction. This latter construction, of course, eliminates the possibility of any blank spaces on the inner wall of the plunger 2 which will not be acted upon by the scraping edges 12.

In the alternative form of construction shown in Fig. 4, the lands 20, separated by the groove 21, are annular instead of helical. In other words, the lands 20 are of zero pitch and they, of course, act successively rather than simultaneously to scrape off material adhering to the inner surface of the plunger 2. Otherwise, the mode of operation of the modified form of construction of Fig. 4 is analogous to that previously described.

In the operation of the lands or scraping edges on the spreader in the above-described forms of construction embodying the invention, it will be appreciated that the principle of such operation is analogous to that of an internal broach. In other words, the material is removed from the internal surface of the annular plunger by virtue of a relative axial movement between the plunger and the lands and scraping edges on the spreader. In the form of construction shown in Figs. 5, 6 and 7, the scraping action of the lands for removing material from the inner surface of the annular plunger is in the nature of the principle of operation of a reamer, viz., the removal of the material from the interior of the annular plunger occurs by virtue of a relative rotation between the plunger and the spreader.

Thus, in the form of construction of Fig. 5, the spreader 6' has a plurality of axially parallel lands 22 on its outermost end which closely contacts with the inner surface of the annular plunger 2'. The longitudinal or axial extent of the lands 22 are preferably made to be substantially as great as the extent of travel of the plunger 2', in order that all of the interior surface of the latter which moves down into the interior of the cylinder 1 and is, therefore, subjected to contact with the casting material, is actuated upon by the parallel lands 22. The lands 22 are, of course, separated by the grooves 23, and present the relatively sharp scraping edges along their tops.

The plunger 2' is rotatably attached to the end of the piston rod 24 of the hydraulic cylinder (not shown) and by means of the flanged retaining cap 25. An inwardly directed, radial flange 26 on the cap 25 engages with the flange 27 on the end of the plunger 2' and holds the latter against longitudinal, but not radial movement with respect to the end of the piston 24. The cap 25 has a slot 28 in its side wall through which the manipulating lever 29 extends. The angular extent of the slot 28 is preferably slightly greater than the angular spacing of the lands 22. Thus, if the lands are eight in number, as shown in the construction of Figs. 5, 6 and 7, they will be located at an angular spacing of 45°. The extent of the slot 28 will then be made about 60°. The lever 29, when the plunger 2' reaches the end of its return stroke position, such as shown in Fig. 5, is moved back and forth, either manually or by a suitable mechanical means, whereby the lands 22 scrape off and remove excess casting material from the interior surface of the plunger 2'. The same dimensional relationship between the diametral extent of the lands 22 and that of the cylindrical surface of the spreader 6' exists in the construction of Figs. 5, 6 and 7, as in the case of the previously described construction of Figs. 1 to 4, inclusive.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, and the end portion of the surface of said spreader adjacent the end of said plunger when at the end of its return stroke having lands and grooves, said lands contacting the inner surface of said plunger.

2. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, and the end portion of the surface of said spreader adjacent the end of said plunger when at the end of its return stroke having lands and grooves, said lands presenting scraping edges contacting the inner surface of said plunger.

3. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, and the end portion of the surface of said spreader adjacent the end of said plunger when at the end of its return stroke having lands and grooves, said lands presenting scraping edges contacting the inner surface of said plunger, said lands being of slightly greater diametral extent than said uniformly cylindrical portion.

4. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, the wall of said cylinder having a casting material feed opening, and a sharp, acute angular edge on said last-named wall adjacent said opening and adapted to remove casting material adhering to the outer surface of said plunger during movement of the latter.

5. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, the wall of said cylinder having a casting material feed opening, and a sharp, acute angular edge on said last-named wall adjacent said opening and adapted to remove casting material adhering to the outer surface of said plunger during movement of the latter, said sharp edge extending slightly beyond the end of said plunger when the latter is at the end of its return stroke.

6. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, and the end portion of the surface of said spreader adjacent the end of said plunger when at the end of its return stroke having lands and grooves, said lands contacting the inner surface of said plunger, the wall of said cylinder having a casting material feed opening, and a sharp, acute angular edge on said last-named wall adjacent said opening and adapted to remove casting material adhering to the outer surface of said plunger during movement of the latter.

7. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, and the end portion of the surface of said spreader adjacent the end of said plunger when at the end of its return stroke having lands and grooves, said lands contacting the inner surface of said plunger, the wall of said cylinder having a casting material feed opening, and a sharp, acute angular edge on said last-named wall adjacent said opening and adapted to remove casting material adhering to the outer surface of said plunger during movement of the latter, said sharp edge extending slightly beyond the end of said plunger when the latter is at the end of its return stroke.

8. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, and a plurality of helical lands having relatively sharp top edges on the end of said spreader adjacent the end of the return stroke position of said plunger, the tops of said lands contacting the inner surface of said plunger.

9. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, and a plurality of helical lands having relatively sharp top edges on the end of said spreader adjacent the end of the return stroke position of said plunger, the tops of said lands extending radially slightly beyond said uniformly cylindrical portion and contacting the inner surface of said plunger.

10. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, and a plurality of helical lands having relatively sharp top edges on the end of said spreader adjacent the end of the return stroke position of said plunger, the tops of said lands contacting the inner surface of said plunger, the helical pitch of said lands being sufficient to produce an overlap of opposite ends of adjacent lands in an axial direction.

11. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, and a plurality of helical lands having relatively sharp top edges on the end of said spreader adjacent the end of the return stroke position of said plunger, the tops of said lands extending radially slightly beyond said uniformly cylindrical portion and contacting the inner surface of said plunger and the helical pitch of said lands being sufficient to produce an overlap of opposite ends of adjacent lands in an axial direction.

12. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, and a plurality of axially spaced annular lands on the end of said spreader adjacent the end of the return stroke position of said plunger.

13. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, and a plurality of axially spaced annular lands on the end of said spreader adjacent the end of the return stroke position of the plunger, said lands having a slightly greater diameter than that of said uniformly cylindrical portion.

14. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, a plurality of helical lands having relatively sharp top edges on the end of said spreader adjacent the end of the return stroke position of said plunger, the tops of said lands contacting the inner surface of said plunger, the wall of said cylinder having a casting material feed opening, and a sharp, acute angular edge on said last-named wall adjacent said opening and adapted to remove casting material adhering to the outer surface of said plunger during movement of the latter.

15. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, a plurality of helical lands having relatively sharp top edges on the end of said spreader adjacent the end of the return stroke position of said plunger, the tops of said lands extending radially slightly beyond said uniformly cylindrical portion and contacting the inner surface of said plunger, the helical pitch of said lands being sufficient to produce an overlap of opposite ends of adjacent lands in an axial direction, the wall of said cylinder having a casting material feed opening and a sharp, acute angular edge on said last-named wall adjacent said opening and adapted to remove casting material adhering to the outer surface of said plunger during movement of the latter.

16. In an injection device for a pressure casting machine, the combination of a cylinder, an annular pressure plunger adapted to reciprocate in an injection stroke and in a return stroke within said cylinder, a spreader mounted within said plunger, the major portion of the surface of said spreader being uniformly cylindrical, a plurality of axially spaced annular lands on the end of said spreader adjacent the end of the return stroke position of the plunger, said lands having a slightly greater diameter than that of said uniformly cylindrical portion, the wall of said cylinder having a casting material feed opening and a sharp, acute angular edge on said last-named wall adjacent said opening and adapted to remove casting material adhering to the outer surface of said plunger during movement of the latter.

17. In an injection device for a pressure casting machine, the combination of a cylinder, an annular pressure plunger adapted to reciprocate in an injection stroke and in a return stroke within said cylinder, the major portion of the surface of said spreader being uniformly cylindrical, a plurality of axially parallel lands on the end of said spreader adjacent the end of the return stroke position of said plunger, said lands having scraping edges adapted to closely contact with the inner surface of said plunger, and means for relatively rotating said plunger with respect to said spreader.

NATHAN LESTER.